United States Patent [19]
Campbell, Jr.

[11] Patent Number: 5,181,319
[45] Date of Patent: Jan. 26, 1993

[54] SQUEEZE-ON INSULATION FOR REHEATING FURNACE WATER COOLED SKID SYSTEMS

[76] Inventor: Frank Campbell, Jr., 6923 Ashmore Dr., Houston, Tex. 77069

[21] Appl. No.: 819,301

[22] Filed: Jan. 9, 1992

[51] Int. Cl.$^5$ .............................................. B21D 53/00
[52] U.S. Cl. .................... 29/890.053; 29/432; 29/446; 432/234; 138/149
[58] Field of Search ............ 29/895.2, 895.21, 895.213, 29/895.3, 446, 448, 432, 890.053, 890.31, 890.032; 432/3, 234, 252; 138/149; 264/241, 259, 271.1

[56] References Cited

U.S. PATENT DOCUMENTS

| | | | |
|---|---|---|---|
| 3,781,167 | 12/1973 | Ahonen | 432/234 |
| 4,071,311 | 1/1978 | Errington | 432/234 |
| 4,140,484 | 2/1979 | Payne | 432/234 |
| 4,255,127 | 3/1981 | Skifano | 432/3 |
| 4,386,630 | 6/1983 | Gapinski | 138/149 |
| 4,428,730 | 1/1984 | Holmes | 423/3 |

Primary Examiner—Mark Rosenbaum
Assistant Examiner—S. Thomas Hughes
Attorney, Agent, or Firm—Fulbright & Jaworski

[57] ABSTRACT

A method for insulating a pipe, including skid pipes for walking beam and pusher type furnaces and the well known over-and-under skid pipe, including providing an appropriately contoured anchor band which can be applied around the pipe, the two ends secured together, each anchor band having a plurality of outwardly projecting prongs. A ceramic fiber blanket is applied around the exposed part of the pipe and then a pliable refractory material is applied around the blanket so that the prongs extend through the blanket and sufficiently into the pliable refractory material to support the refractory material around the pipe. Preferably a preformed insulator laminae comprising a ceramic fiber blanket, a pliable refractory material and a plastic-like film between and secured to them is applied to the prongs to reduce installation time. A suitable outer mold form is applied around the insulator laminae and a mold compression band is compressed around the mold form to compress the ceramic fiber blanket, generally contour the pliable refractory material to the shape of the pipe and secure the insulation around the pipe. Alternative methods include the use of a restraint band having an inner inflatable pressure tube and inwardly adjacent all segments, expanding the pressure tube to achieve substantially conforming insulation secured to the pipe.

22 Claims, 19 Drawing Sheets

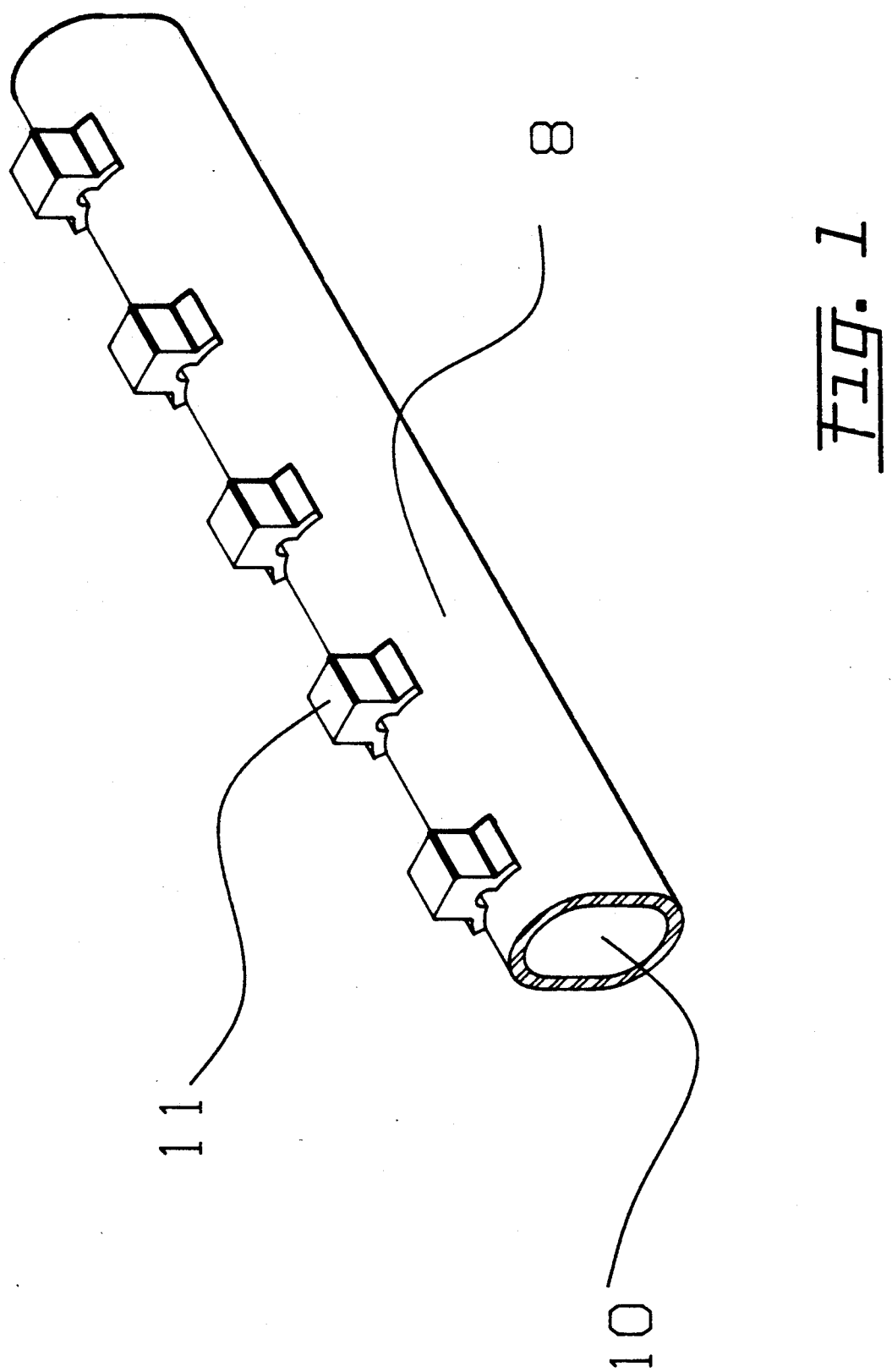

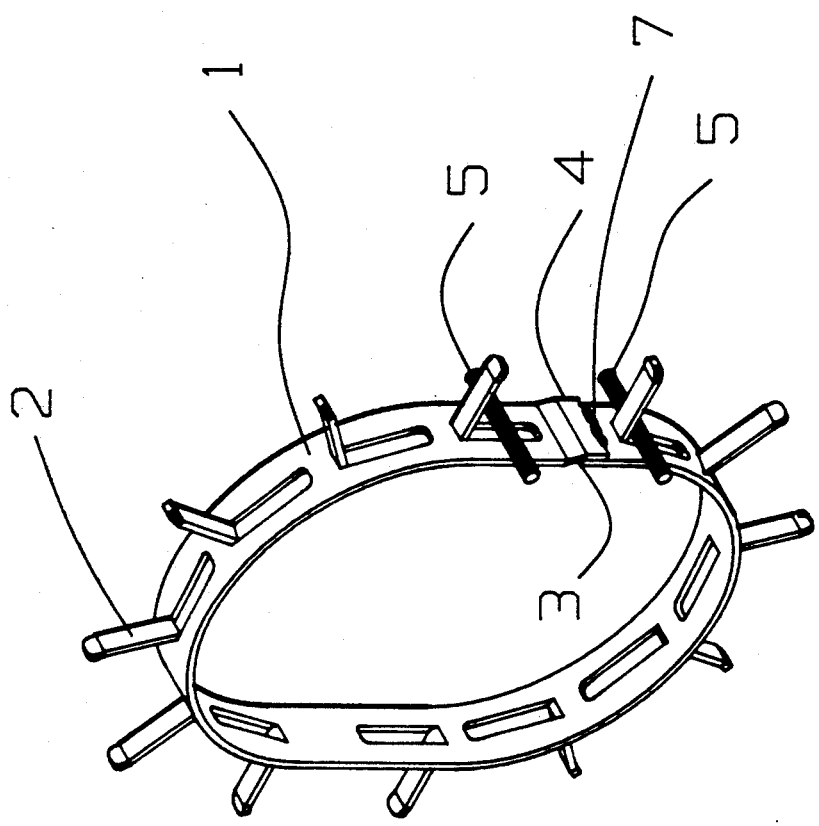

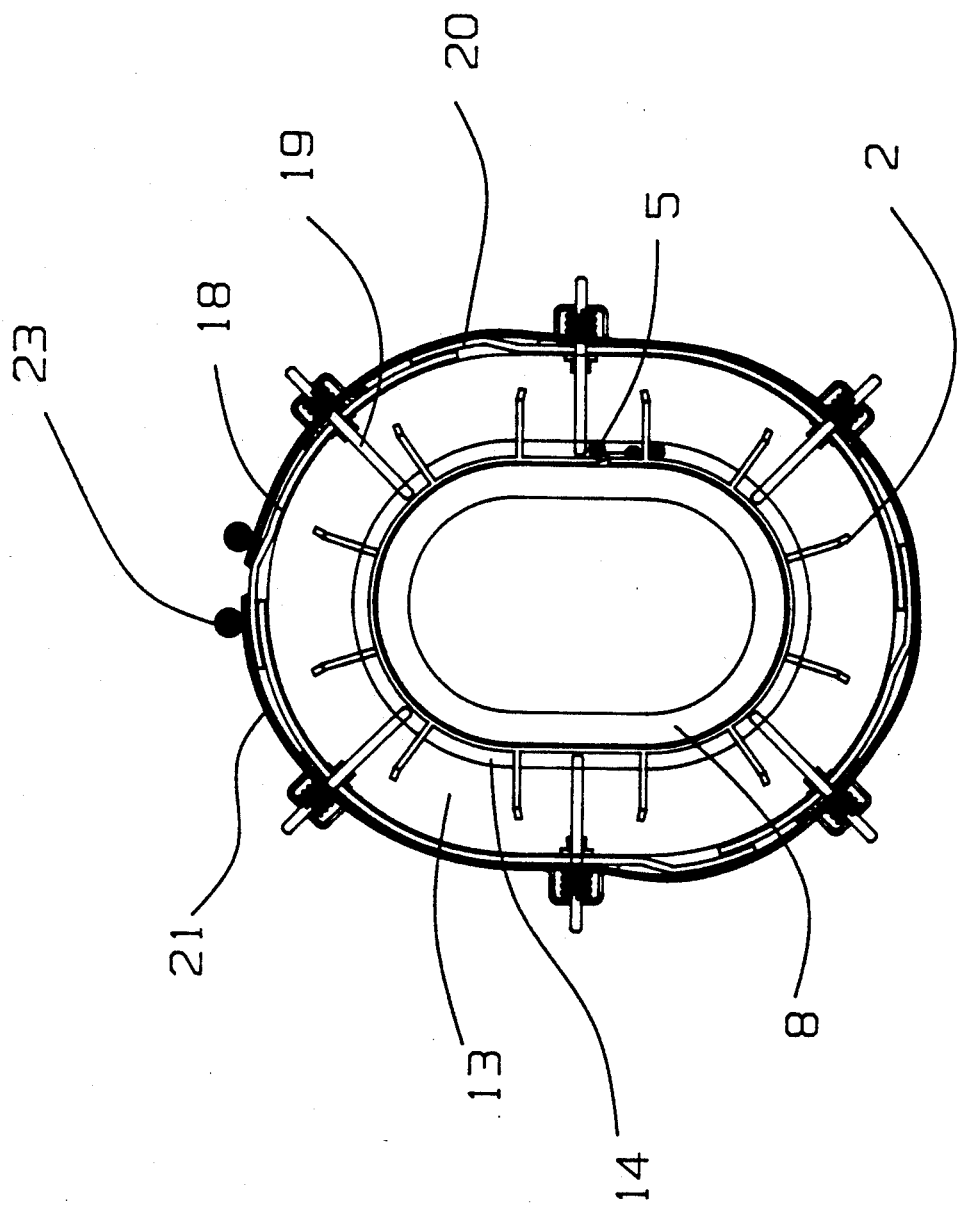

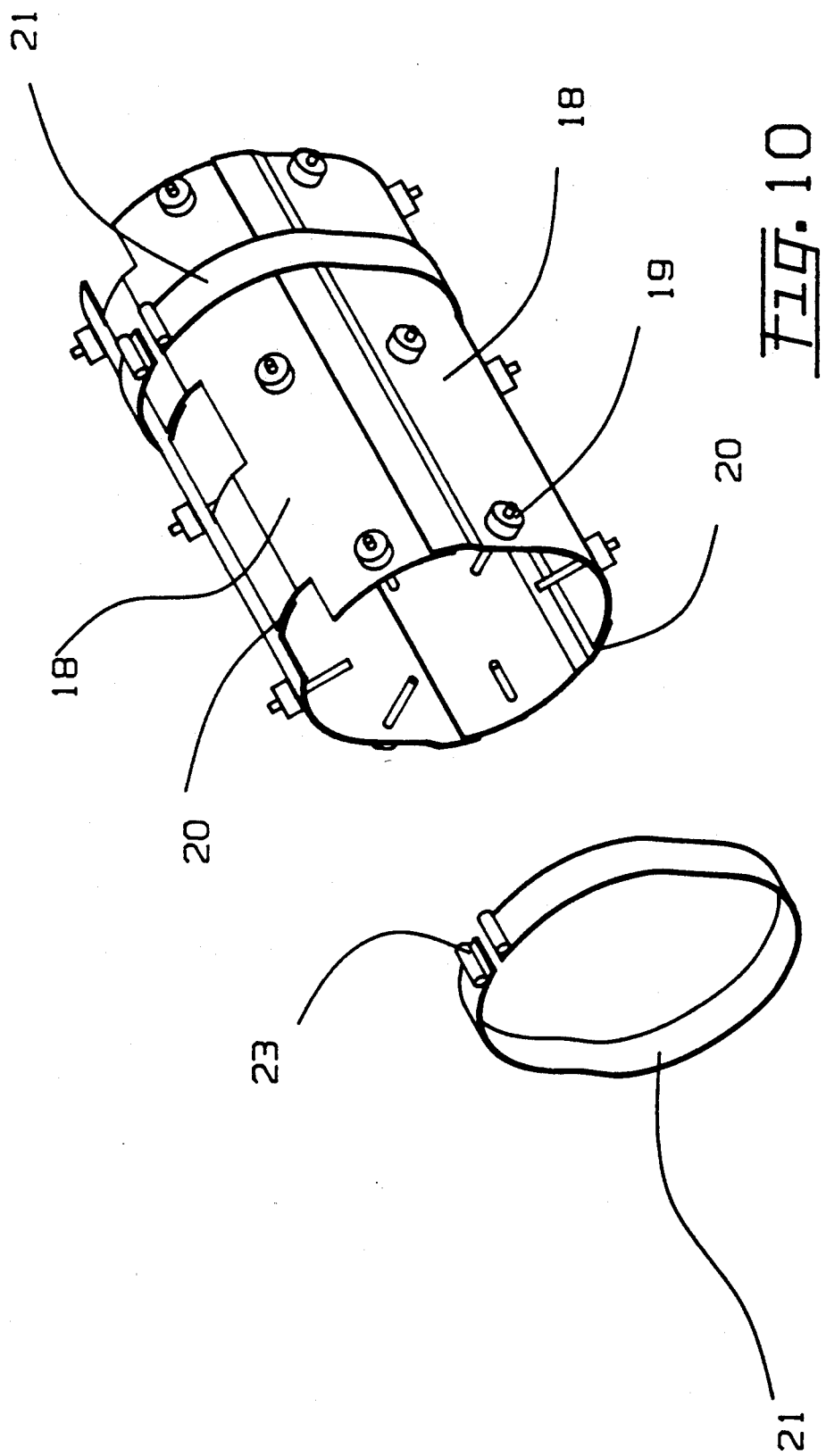

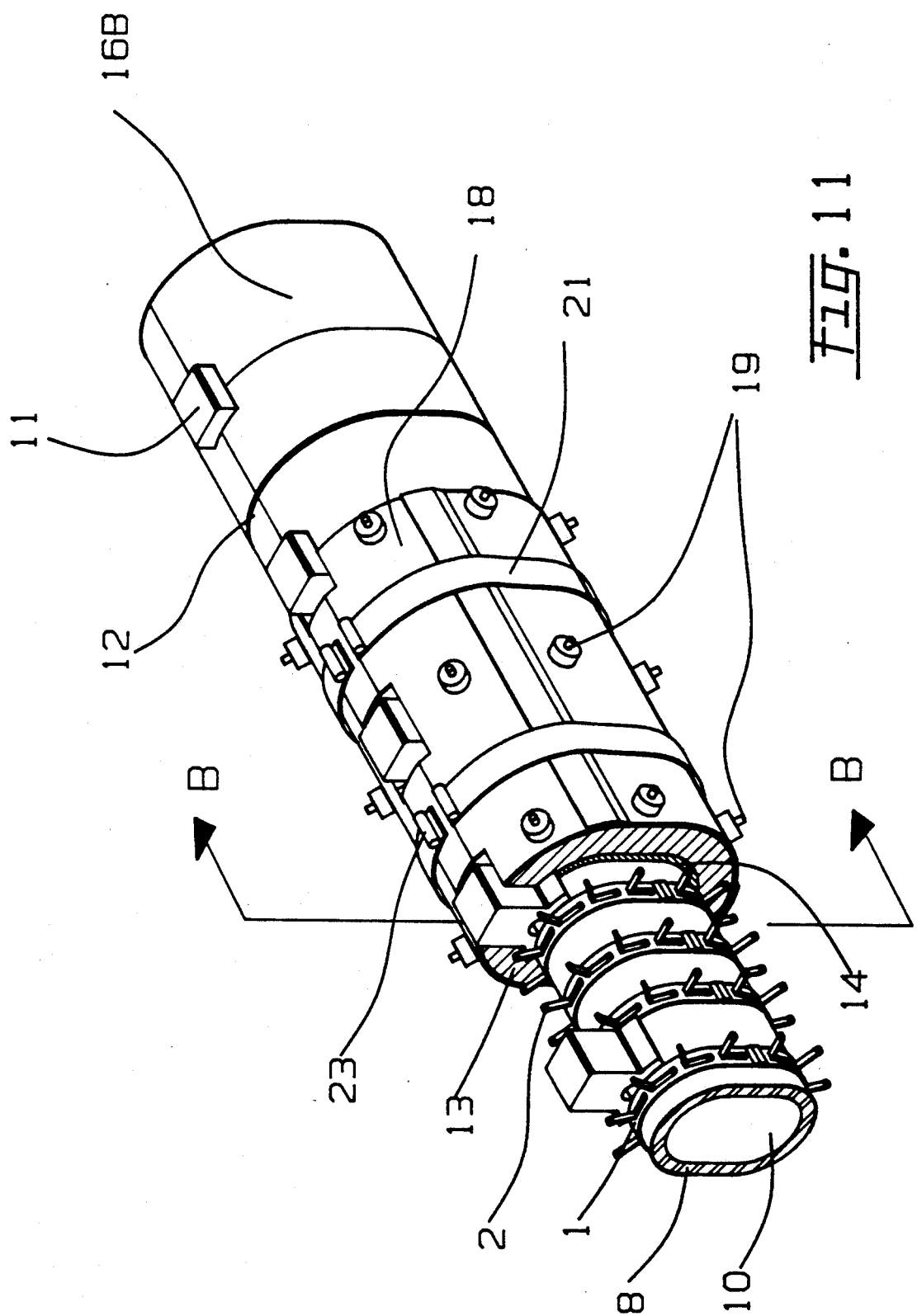

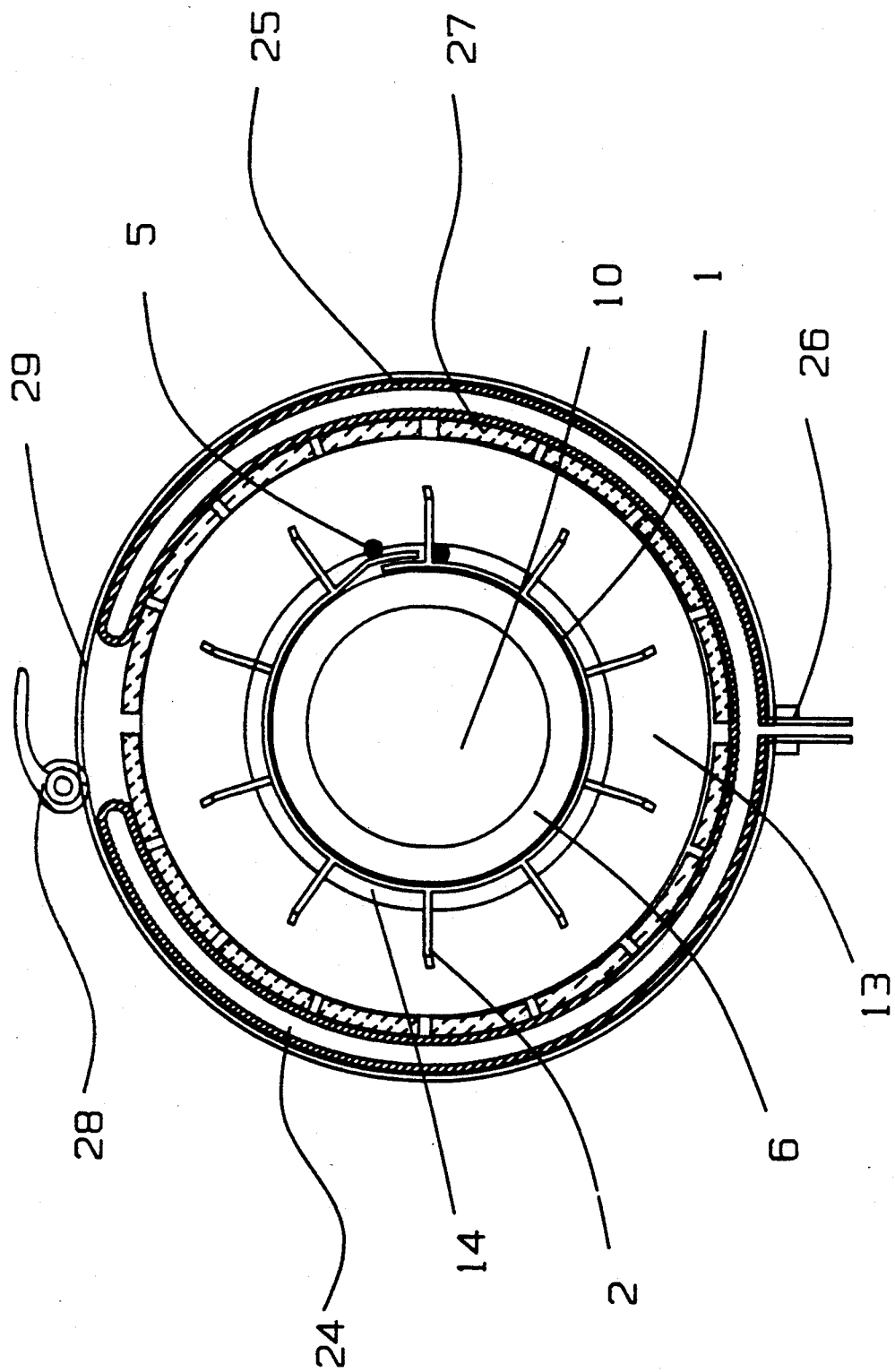

SQUEEZE-ON INSULATION FOR REHEATING FURNACE WATER COOLED SKID SYSTEMS

BACKGROUND OF THE INVENTION

In furnaces used throughout the metallurgical and related industries to heat metallic workpieces such as slabs, blooms, billets or other raw steel shapes prior to further processing into useful finished products, the typical furnace includes a complex network of insulated vertical and horizontal water-cooled pipes which support an additional network of water-cooled skid pipes with rails along which the slabs, blooms, billets or other raw steel shapes are pushed or walked through the furnace. The metallurgical furnace is an open system; that is, furnace heat which is lost to the metal pipe network is then conducted by the flowing water to a point outside the furnace and is not recoverable. Accordingly, vast amounts of heat losses occur and correspondingly unnecessary amounts of energy are expended to replace the heat loss transferred into the water-cooled pipe network. For example, in a furnace having a water-cooled piping infrastructure of uninsulated skid pipes and supporting pipe, as much as twenty-five percent of the total heat supplied to a metallurgical furnace by the combustion of fuels may be lost to the water-cooled skid pipe infrastructure. For a 6 inch OD uninsulated water-cooled pipe in a furnace operating at 1800°-2400° F., the heat loss is approximately 60,000-140,000 Btu per lineal foot per hour. For a furnace having 600 feet of skid pipe, 200 feet of horizontal support pipe and 400 feet of vertical support pipe, the heat loss is thus approximately $1200 \times 100,000$ Btu/hour or 120,000,000 Btu/hour.

In order to reduce the heat loss, various types of refractory and insulating materials have been affixed to the outside surface of the water-cooled piping. The variety of attachment methods and materials has included the use of pre-fired or chemically bonded refractory materials which are welded, studded, wired, clipped or anchored with interlocking devices. Moreover, refractory concrete materials have even been formed in place around the pipe surfaces, the refractory concrete being supported by a great number of metallic anchors which are individually welded to the pipe surface. Almost without exception, these forms of insulation have failed within a relatively short period of operation because of the inherent friability and susceptibility to fracture of the brittle concrete, fired ceramic or chemically bonded refractory materials. As the raw steel workpiece is moved along the metal skid rail pipe, significant vibration and flexion of the water-cooled pipe infrastructure occur which are in turn transmitted into the insulation material. Consequently, the combination of high temperature furnace gases and the flexion and vibration within the pipes fractures the brittle refractory material and oxidizes the metallic anchors, thereby causing early failure of the insulation which falls to the furnace floor.

Water-cooled skid pipe infrastructures having complex cross-sectional geometry of the individual pipe elements to achieve greater mechanical strength are currently in wide use in metallurgical heating furnaces. The greater strength of these pipes allow a significant reduction in the total number of support elements in the skid pipe infrastructure and a consequent reduction in the potential heat loss to the water-cooled skid pipes. These skid pipes have complex cross-sectional geometry and often vary in dimension due to deviations in manufacturing or fabrication methods. These variations cause undesirable gaps between the outer surface of the pipe and the inside surface of the pre-formed insulation shapes. The presence of these gaps results in premature insulator failure caused by over-heating and oxidation of the internal insulator metallic anchors which, in order to provide an effective and efficient conductive cooling path to prevent overheating and oxidation, must always be in very close and intimate communication with the water-cooled skid pipe.

A current method often used to insulate water-cooled skid pipes of complex cross-sectional geometry incorporates the use of (1) individually positioned metallic anchors welded directly to the outer surface of the water-cooled ski pipe; (2) a resilient ceramic fiber insulating blanket wrapped around the water-cooled skid pipe; and (3) an outer layer of durable refractory concrete. The anchors are usually installed in a pattern that results in a uniformly spaced apart distance of 3-4 inches, resulting in a requirement for as many as 75,000-90,000 individually welded anchors for a typical water-cooled skid infrastructure. The layer of ceramic fiber insulating blanket is wrapped around the skid pipe, impaled upon the welded metallic anchors, and compressed to result in protrusion and exposure of 60-70 percent of the metallic anchors length. A variety of appropriate forms are then positioned around the ceramic fiber to allow for casting and shaping of an outer refractory concrete layer of the insulation system. After proper curing of the refractory concrete, the forms are removed and the refractory concrete is further allowed to dry. This method of affixing insulation to the skid pipe surface is an improvement over the older method of casting refractory concrete directly in contact with the water-cooled skid pipe since the intermediate layer of resilient ceramic fiber blanket acts as a cushion that absorbs some of the pipe vibrations and reduces the effect of skid pipe flexion on the insulation.

Those skilled in the art understand that the periodic replacement of this type insulation is required because of other furnace operating factors such as chemical attack by hot furnace gases, fluxing agents, products of combustion, and the effect of periodic thermal cycling of the furnace.

Those skilled in the art also understand that the replacement of this welded metallic anchor/ceramic fiber/refractory concrete insulation is complex and time consuming requiring the complete removal of the oxidized metallic anchor remains by scarfing and refurbishment of the scarf damaged original pipe surface. Experience has shown that the total time for re-insulation often takes 14-21 days depending on the total lineal feet of water-cooled pipe network within the furnace. This furnace "downtime" is costly to the operator.

SUMMARY OF THE PRESENT INVENTION

The invention is a method for the attachment of thermally efficient insulation materials to the surface of a water-cooled support and skid pipes in a metallurgical reheating furnace.

The method replaces the conventional method for welding a large number of individual metallic anchors to the skid or support pipe.

The method also provides a means for simultaneously attaching an inner layer of resilient, highly insulating ceramic fiber blanket and an outer layer of durable high temperature, chemically bonded, pliable refractory material, so that the inner ceramic fiber layer is in close communication with the outer surface of the water-cooled skid or support pipe. The method of attachment can be used with any type of conventional or specially designed skid or support pipe, regardless of the cross-sectional shape of the pipe including the dual "over-and-under" skid pipes commonly used in furnaces.

An elongated, relatively thin flexible metallic anchor strap having a plurality of integral spaced apart and outwardly protruding prongs is positioned around the perimeter of the skid or support pipe so that the ends overlap and at the same time are engaged by a cinching tool.

One may tighten the flexible metallic anchor strap about the skid or support pipe with the cinching tool until the inner surface of the strap closely conforms to the outer surface of the pipe, and then weld the ends of the outer surface of the metallic anchor strap to each other and/or the pipe.

Those skilled in the art will understand that other means such as clipping, pinching or bolting can be used in place of the preferred method of welding as a means of securing the ends of the anchor strap each to the other.

This process is repeated until achieving the desired spaced apart positioning of the metallic anchor straps along the length of skid or support pipe to provide anchoring of the insulating materials.

It is therefore an object of the present invention to provide an easily installed insulation anchoring device having a plurality of anchoring prongs in close thermal communication to the pipe that do not require their individual welding to the pipe.

A further object of the present invention is to provide a means for rapid application of a thermally efficient refractory insulating material to any water-cooled skid or support pipe having either a conventional or a complex cross-sectional geometry.

An even further object of the present invention is to eliminate or reduce the time for refractory and insulation material curing and drying.

These and other objects of the present invention will become even more apparent when read in light of the specification, drawings and claims appended hereto.

BRIEF DESCRIPTION OF THE DRAWINGS

FIG. 1 is an isometric view of a section of an uninsulated skid pipe in a walking beam furnace having a non-circular cross-section and a plurality of secured, intermittent workpiece wear buttons;

FIG. 2C is the anchor strap shown in FIG. 2A and FIG. 2B whose ends have been cinched and welded together.

FIG. 9 is a cross-sectional view of the device similar to that of FIG. 8 showing the segmented mold forms and the contiguous mold cinching straps for compressing the insulation laminae materials;

FIG. 10 is an isometric view of a mold form and cinching straps shown in FIG. 9;

FIG. 11 is an isometric view of the preferred embodiment of the device and method of application showing some segments of the mold form around corresponding segments of the skid pipe insulation; and FIG. 12 is a cross-sectional view of the preferred embodiment of the structure and method similar to that shown in FIG. 9 but illustrating an alternate method for the application of force to accomplish compression and shape forming of the insulation laminae materials incorporating the use of pneumatic or hydraulic means.

FIG. 13 is an isometric view of an "over-and-under" skid pipe showing the application of an anchor band around each pipe and secured to a pair of anchor strips.

BRIEF DESCRIPTION OF THE PREFERRED EMBODIMENT

The present invention is a method for attaching an insulating material to a fluidically cooled skid pipe or support pipe in a metallurgical furnace in order (1) to reduce the energy lost to the pipe coolant and (2) to reduce the time normally required to apply, cure and dry the insulating materials.

FIG. 1 shows a short section of a fluidically cooled skid pipe 8 with a passageway 10 for conducting a coolant such as water. In walking beam furnaces, intermittently spaced apart alloy wear buttons 11 are often welded or cleated to the pipe 8. Those skilled in the art will understand that an uninsulated pipe as shown in FIG. 1 will transfer vastly greater conductive heat losses to the cooling fluid than the same pipe when insulated.

Figure 2A:
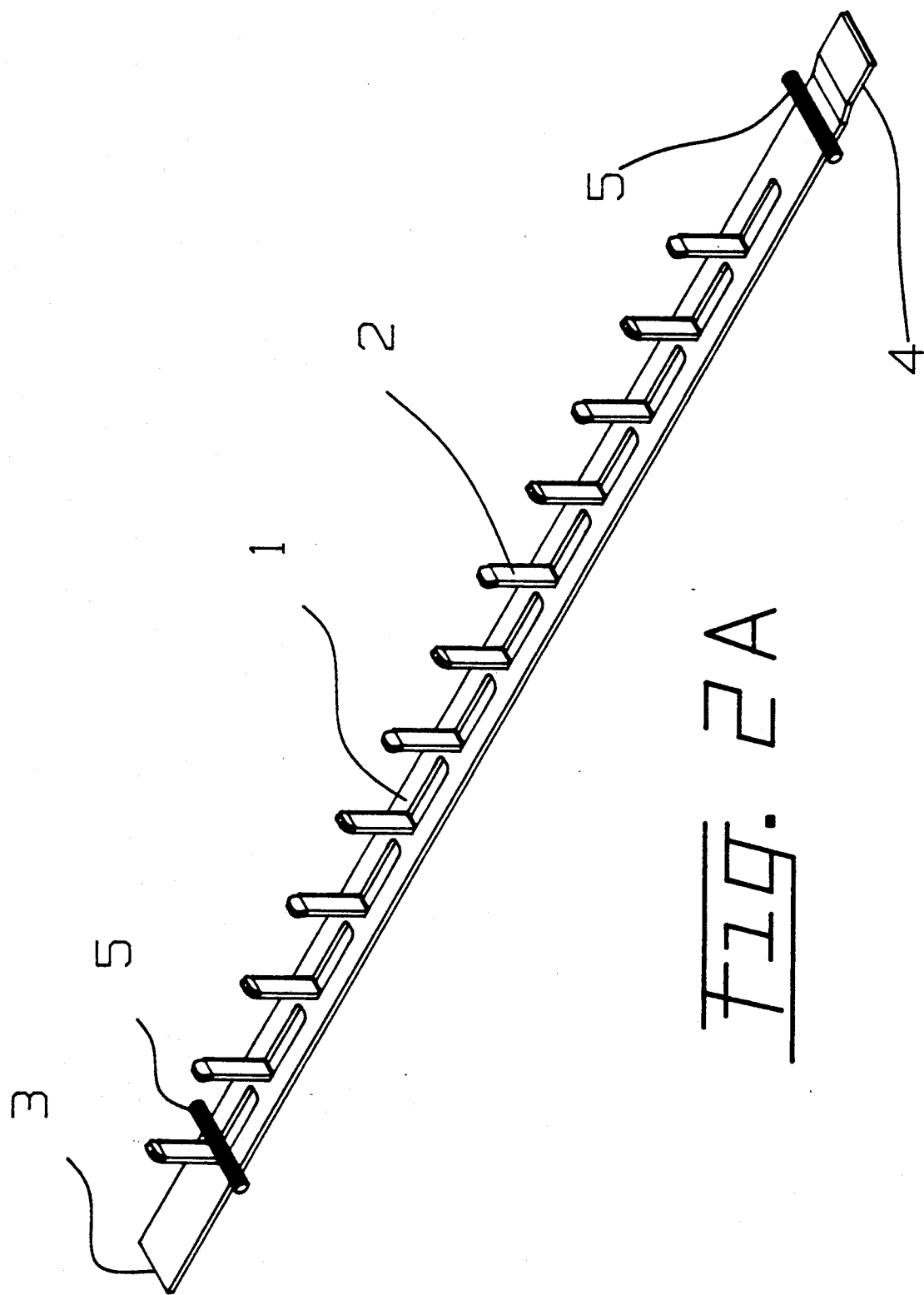
FIG. 2A is a thin gauge, flexible metallic anchor band, including a plurality of integral, spaced apart, outwardly protruding prongs, an ex-tented strap end for overlapping the flat opposing strap end, and a pair of transversely positioned cinching tool engagement lugs.

FIG. 2A shows a thin gauge, flexible straight metallic anchor band 1, preferably made of stainless steel and having high resistance to heat and oxidation such as the AISI 300 series, and most preferably type 310 grade. The metallic straight anchor band 1 has two ends and includes a plurality of attached integral and outwardly protruding prongs 2 spaced apart along the length of the straight anchor band 1. One end of the anchor band 1 terminates in an elongated outwardly ex-tented section 4 with the opposing end of the band 1 terminating in a simple straight cut edge 3. Two engagement lugs 5 are attached, preferably by welding, near the end 3 and ex-tented end 4 of the anchor band 1.

Figure 2B:
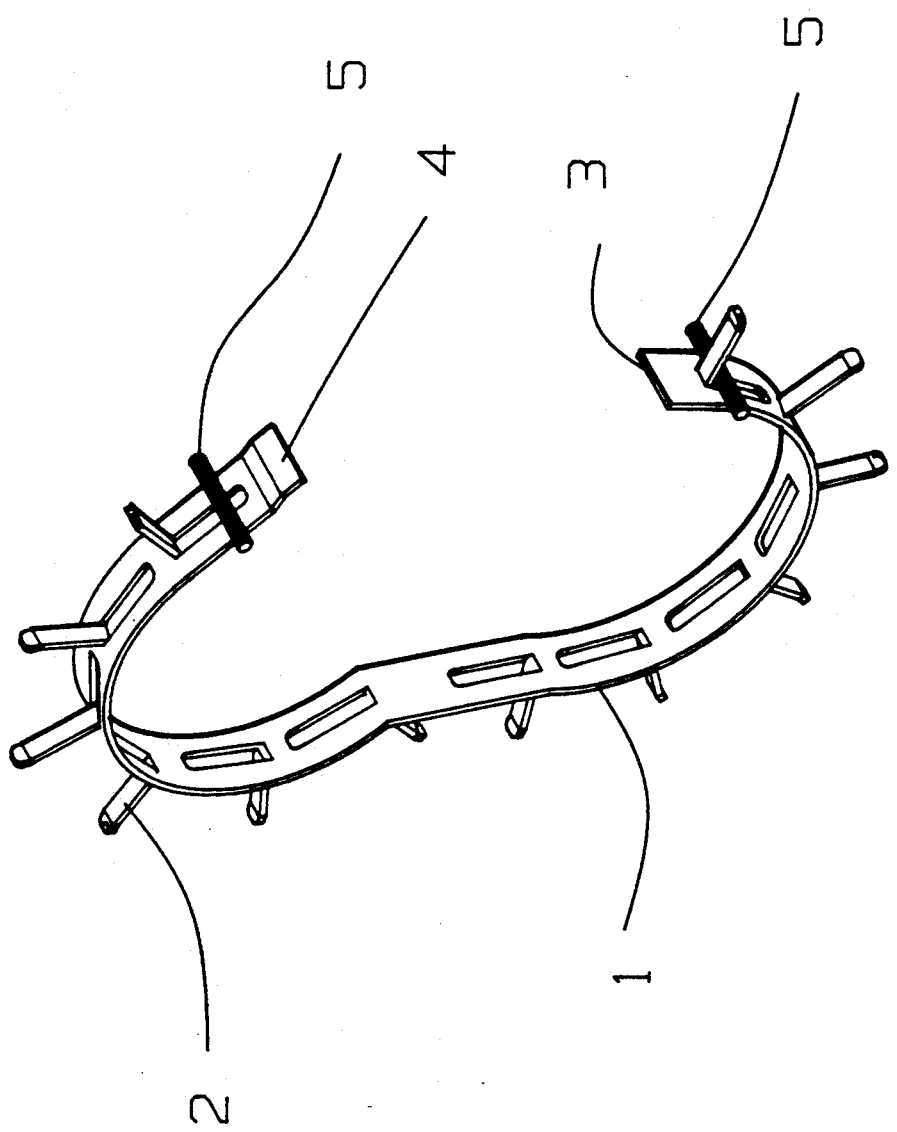
FIG. 2B is the anchor strap described in FIG. 2A that has been pre-formed to a geometry closely conforming to the cross-section of the skid pipe described in FIG. 1.

FIG. 2B shows the curved metallic anchor band 1 after shaping to the approximate geometry conforming to the cross-sectional perimeter of the skid pipe 8.

Figure 4:
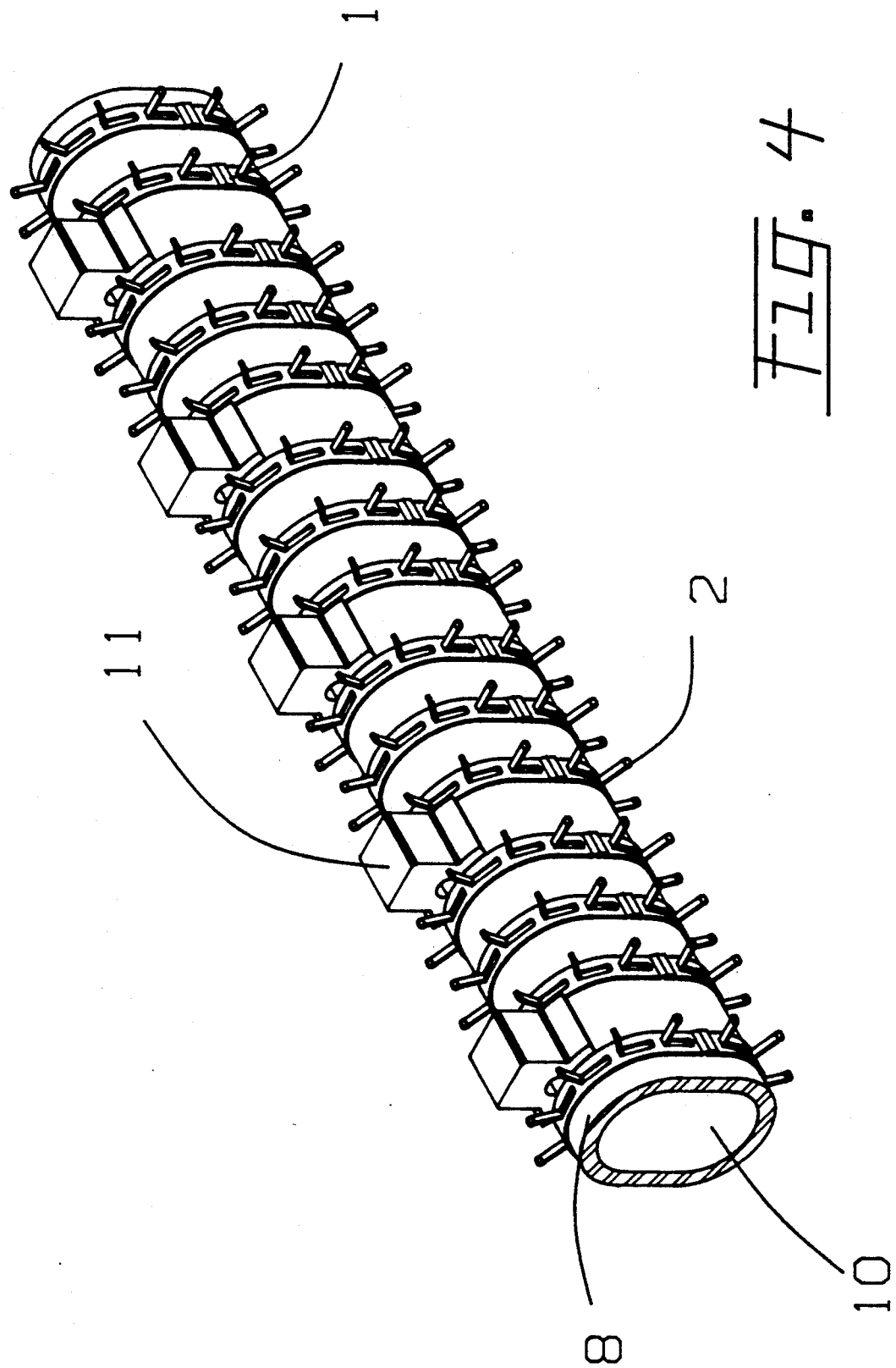
FIG. 4 is the skid pipe described in FIG. 1 after the anchor bands have been cinched about the perimeter of the skid pipe, with the opposing ends of each band welded each to the other.

The anchor band 1 is closed with a cinching tool (not shown) as shown in FIG. 2C. Closure occurs by aligning and overlapping the ex-tented end 4 of the anchor band 1 with the straight opposing end 3. A common cinching tool can be employed on the opposing cinching lugs 5 to tighten the anchor band 1 as contiguously as possible around the skid pipe 8 as shown in FIG. 4. While biasing the overlapping ends 3 and 4 together, they are then welded together to complete the attachment of the anchor band 1 around the skid pipe 8. The weldment may also secure one or both ends to the pipe itself so long as the ends are effectively secured to hold the anchor band 1 in close conformity around the pipe 8. Preferably, the anchor band 1 is secured around the skid pipe 8 so that it does not slip relative to the pipe's outer surface. This method yields a plurality of outwardly protruding prongs 2 in intimate thermal contact with the skid pipe 8 without the requirement for their direct weldment to the pipe 8. In FIG. 4 a number of spaced apart anchor bands 1 are shown attached to a section of walking beam skid pipe 8 to provide a measured plurality of outwardly protruding anchor prongs 2 in a spaced apart pattern along substantially the entire surface of the skid pipe 8 and without interference with the intermittent workpiece wear buttons 11.

Figure 3:
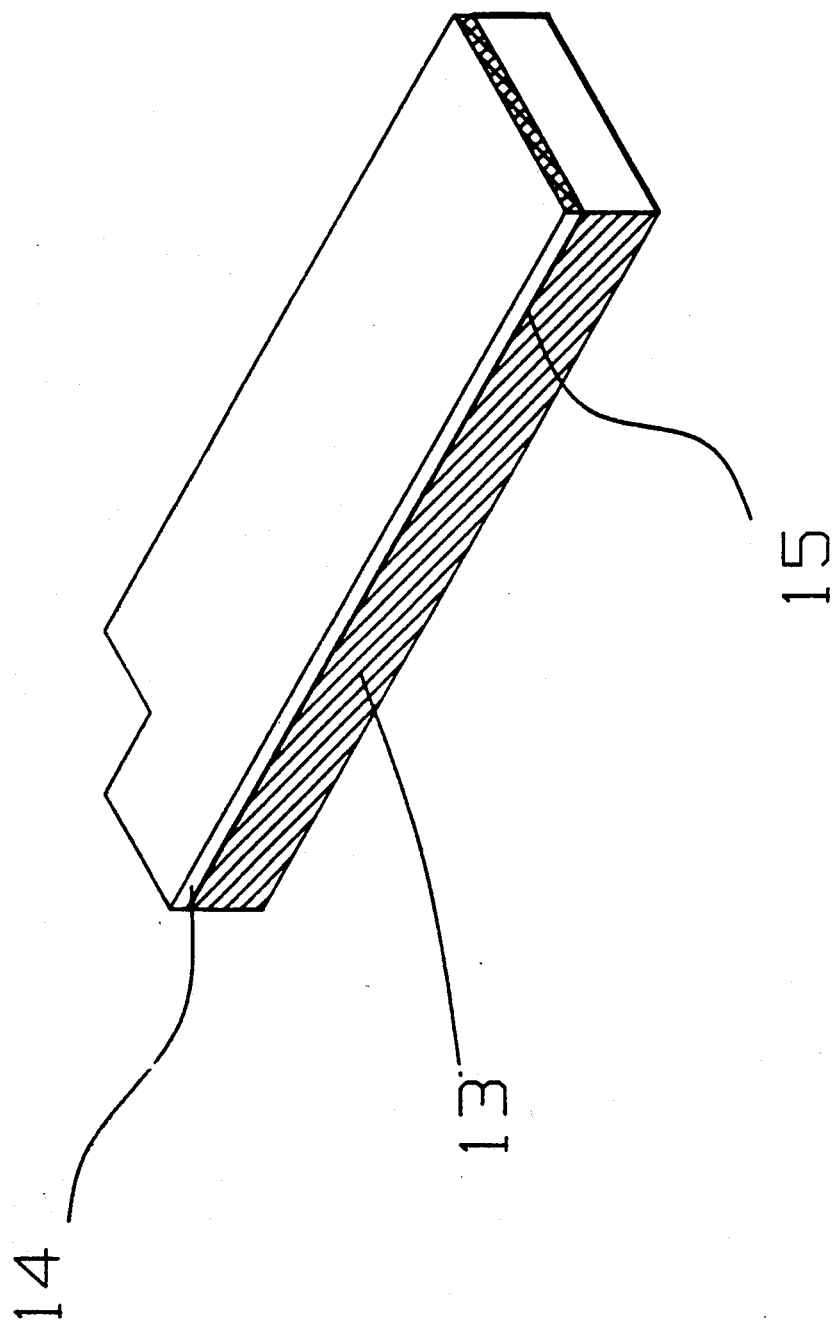
FIG. 3 is an isometric view of a pre-formed block laminae consisting of an upper layer of resilient high temperature ceramic fiber blanket insulating material, and a lower layer of high temperature pliable refractory insulating material, these layers preferably being separated by a contiguous sheet of impervious material.

FIG. 3 shows a block laminae 16 of insulating materials having a wear resistant, durable layer of pliable refractory material 13 and a layer of resilient high temperature, highly insulating ceramic fiber blanket material 14 separated by and contiguous with a thin sheet of impervious plastic like film 15 that inhibits the undesirable migration of the liquidous chemical binder constituents of the pliable refractory layer 13 into the ceramic fiber layer 14. The invention, however, does not require the use of the film 15.

Figure 5:
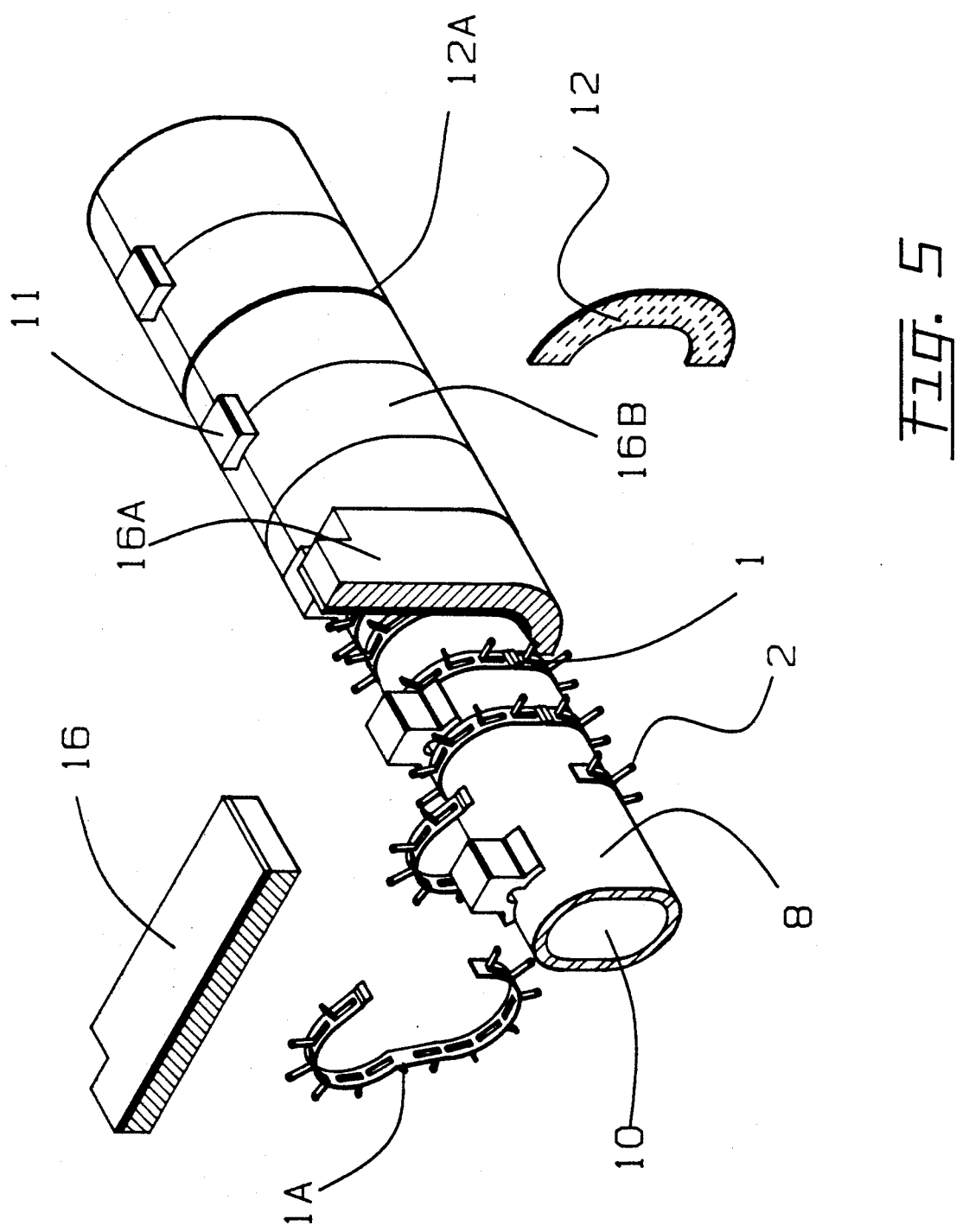
FIG. 5 is an exploded, isometric view of the preferred embodiment of the invention showing the device of FIG. 3 with some segments of the insulation in place around the skid pipe and further showing the expansion gasket halves placed between the laminae blocks, a laminae block partially impaled upon the anchor strap prongs, a pair of cinched and a pair of uncinched anchor bands and an unused block of insulation laminae.

A preferred embodiment of the present invention for a walking beam furnace is shown in FIG. 5. A skid pipe 8 with intermittently spaced wear buttons 11 has a plurality of spaced apart metallic alloy anchor bands 1 closely conforming to and in thermal communication with the outer surface of the skid pipe 8. An uncompressed insulation material block laminae 16A is impaled upon a plurality of the anchor prongs 2 about the perimeter of the pipe 8 such that the ceramic fiber inner layer 14 substantially covers the corresponding outer surface of the pipe 8 and so that the length of the prongs 2 penetrate into the layer 13. Preferably about one-half the length of the prongs will be embedded in the refractory material 13. A laminae block 16 is also shown in FIG. 5 prior to applying it around the pipe 8 adjacent to and opposite the insulation block laminae 16A. Matching pairs of installed laminae blocks 16B are shown around the entire perimeter of the fluidically cooled pipe 8 excluding the intermittently spaced wear buttons 11. Pairs of pre-formed semi-resilient ceramic fiber expansion gaskets 12 preferably space apart the block laminae pairs 16B at locations denoted as 12A. These gaskets relieve the compressive forces caused by the expansion of the pliable refractory material 13 when the furnace is heated.

Those skilled in the art understand that the invention also includes the separate steps of first applying the ceramic fiber 14 and then applying the refractory material 13 which can be any suitable material that can be applied around the ceramic fiber 14 and then squeezed and formed thereafter.

Figure 6:
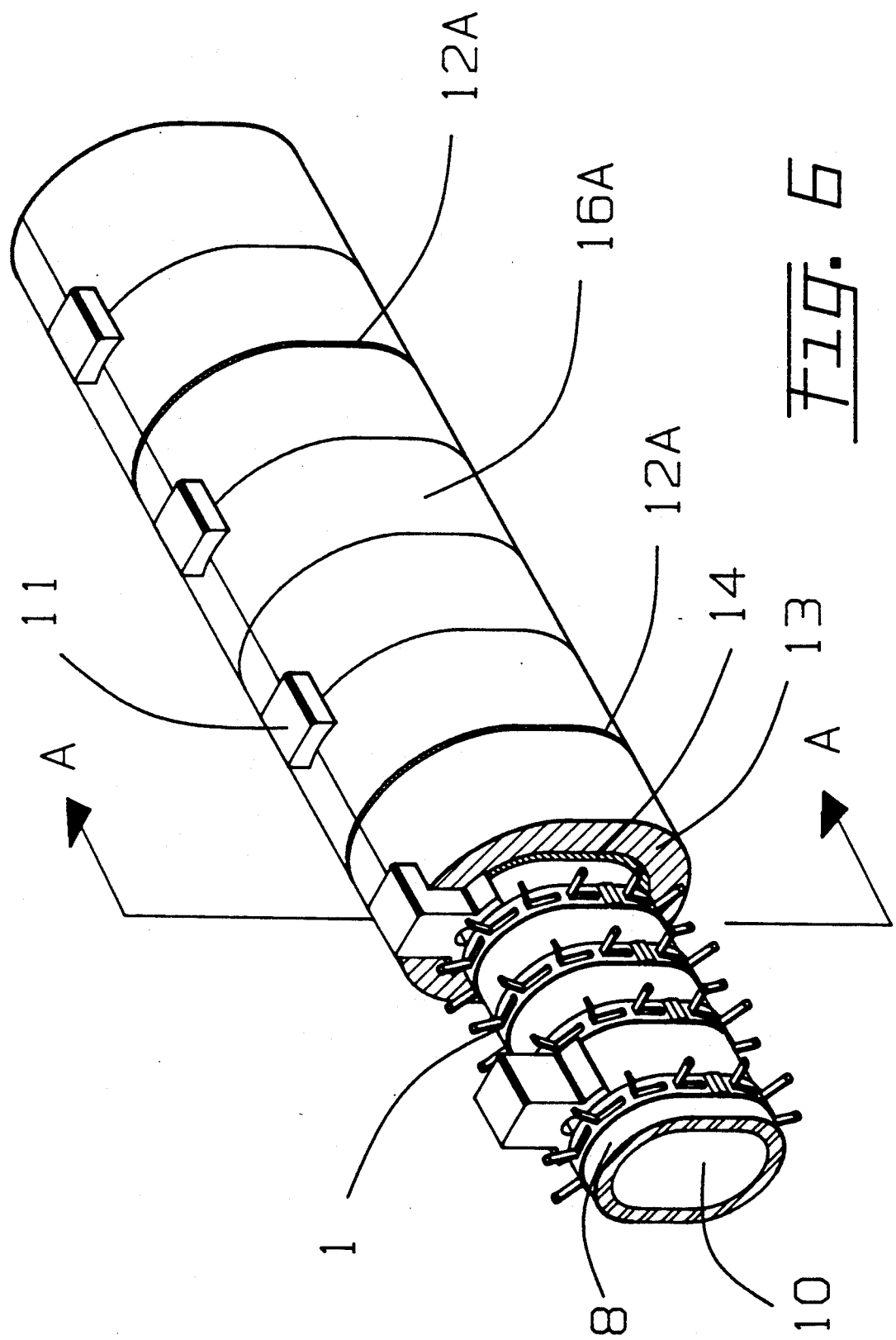
FIG. 6 is a isometric view of the preferred embodiment similar to FIG. 5 but further showing the progress of the insulation installation.

The spaced apart, periodically positioned expansion gasket pairs 12A are oriented substantially normal to the longitudinal axis of the skid pipe 8 as shown in FIG. 6.

Figure 7:
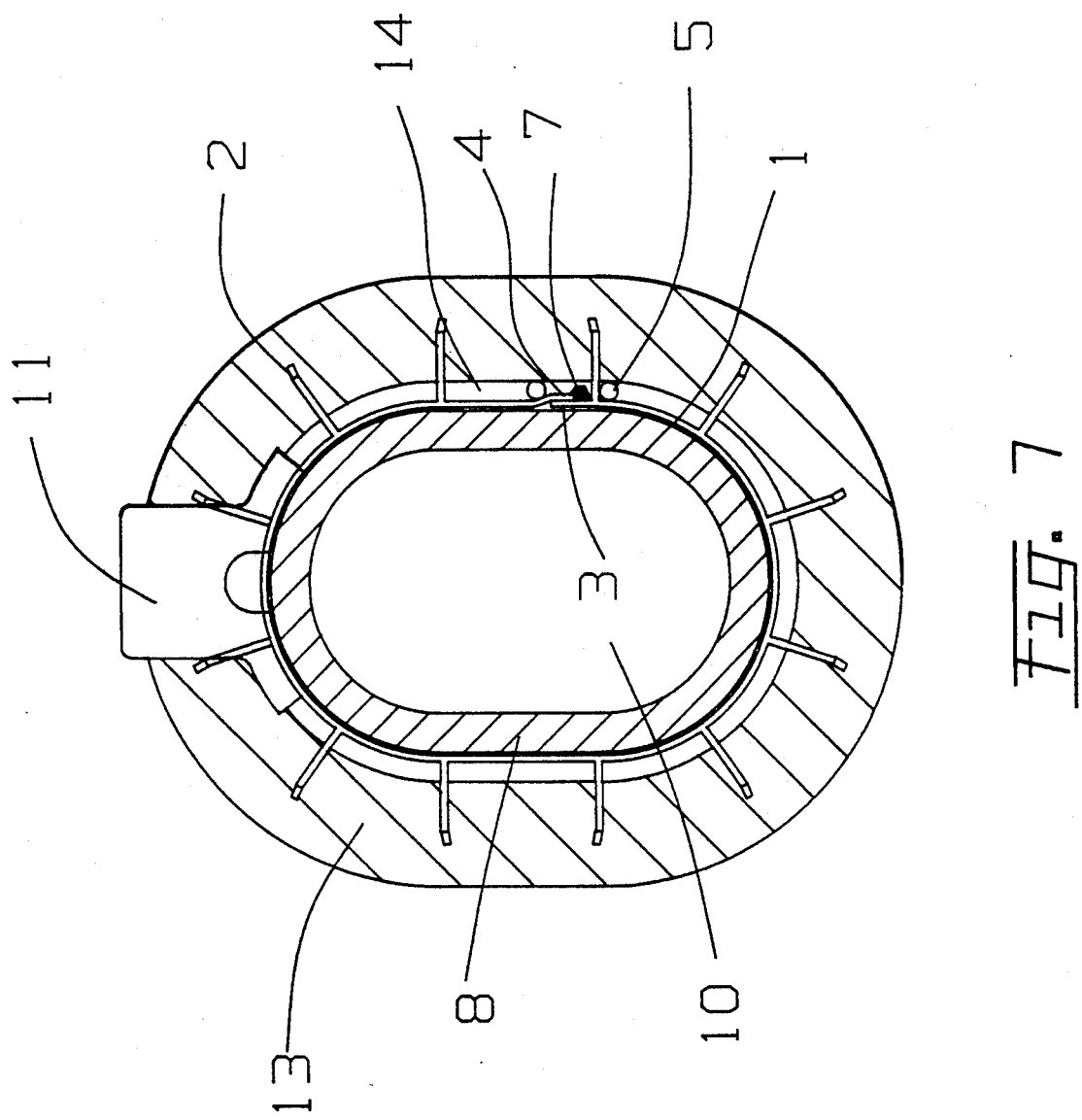
FIG. 7 is an elevation end view in cross-section viewed in the direction of lines A—A of FIG. 6.

The preferred embodiment of the present invention for a walking beam furnace is also shown in FIG. 7. Any skid pipe regardless of its cross sectional geometry, has one or more wear buttons 11 affixed to it, for example, by welding.

An alloy metallic anchor band 1 having a plurality of outwardly protruding prongs 2 is positioned about the perimeter of the pipe 8, so as not to interfere with the intermittently spaced wear buttons 11, such that the straight end 3 is overlapped by the ex-tented end 4. The anchor band has been tightened about the pipe 8 using a suitable cinching tool having a pinching action similar to vice-grip tongs to engage the opposing anchor strap cinching lugs 5. The anchor band is tightened by causing the anchor band cinching lugs 5 to be forced each toward the other until the anchor band is substantially contiguous and in close thermal communication with the perimeter of the pipe 8. While cinching the lugs, the anchor strap ends 3 and 4 are preferably welded at 7. The resilient ceramic fiber inner layer 14 is compressed around the outer surface of the skid pipe 8 by the compression of the outer layer of pliable refractory 13.

Figure 8:
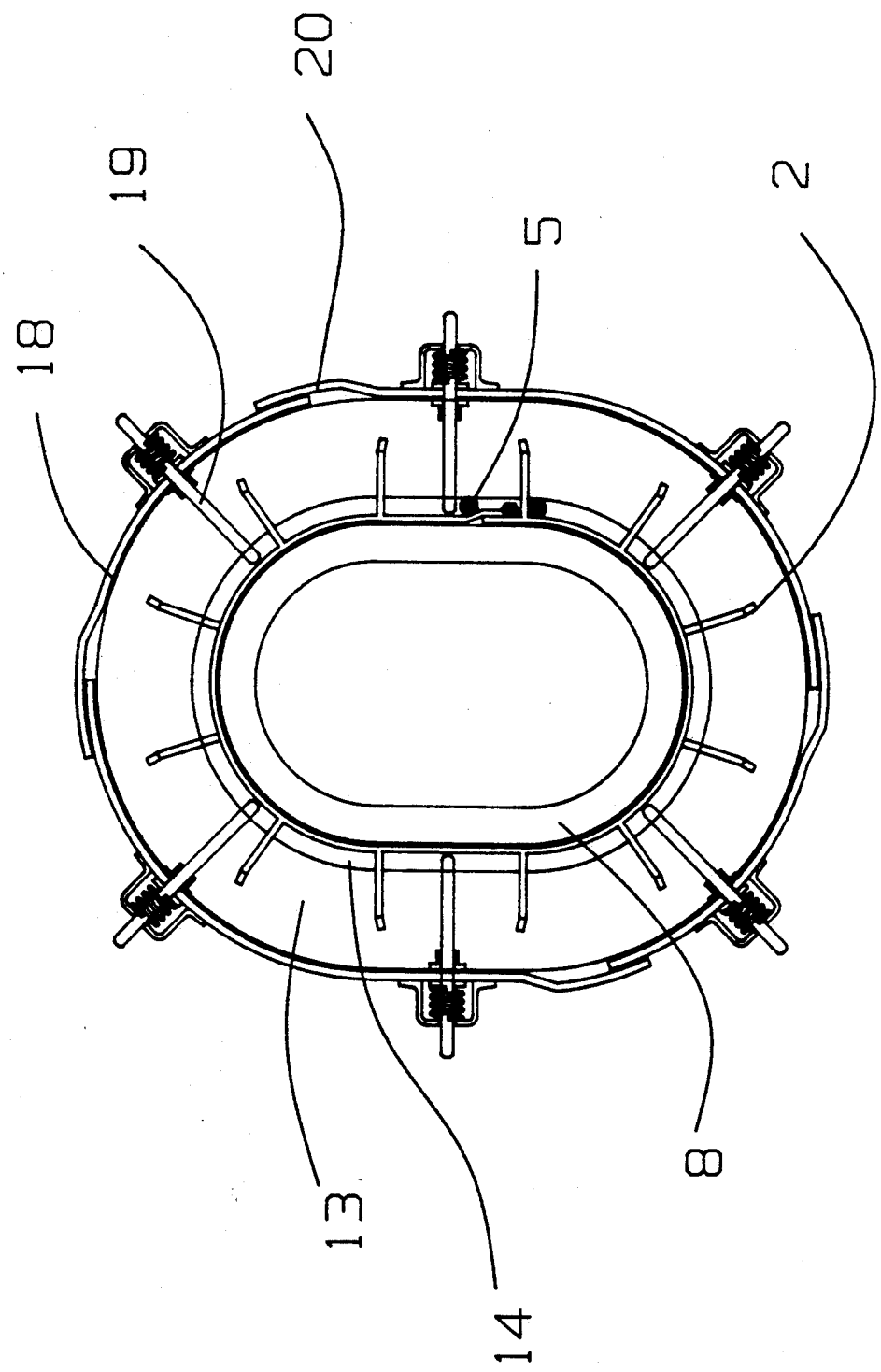
FIG. 8 is a cross-sectional view of the preferred embodiment showing the semi-flexible, overlapping, segmented molding forms positioned in communication and close conformity with the outer surface of the refractory layer.

FIG. 8 further describes the preferred method of application by showing a multiply segmented, semi-flexible outer mold form 18 applied in spaced apart relationship to and around the outer surface of the pipe 8 so that the pliable refractory layer 13 is contained between the pipe 8 and the mold form 18. Each individual mold form segment 18 is provided, for example, with a formed outwardly ex-tented, overlapping slip-flange 20 including at least one biased contour and thickness control pin 19. The overlapping slip-flange 20 prevents binding between adjacent mold form segments 18 during final compression and contour shaping of the pliable refractory layer 13. The biased contour and thickness control pins 19 can be depressed only to a predetermined position when the compression cinching straps 21 shown in FIG. 9 are engaged by, for example, providing a detent or other stop means on the pins. The compression cinching straps 21 surround and bias the collective perimeter of the pre-positioned mold form segments 18 as the cinching straps are tightened by cinching the lugs 23 toward each other.

Opposing cinching lugs 23 of the strap 21 are squeezed together to create an inwardly radial compressive force on the segmented mold form 20. As the cinching action progresses the segmented mold forms 18 move inwardly against the pliable refractory layer 13 urging the pliable refractory 13 inwardly into the desired position and contour as controlled by the spring loaded contour and telescoping thickness pins 19. The displacement is caused by the compression of the inner resilient layer of ceramic fiber blanket 14. FIG. 10 is an isometric view of the complete segmented mold assembly standing alone.

FIG. 11 is an isometric view of the preferred embodiment of the invention showing the segmented mold forms 18 around the outer surface of the pliable refractory layer 13 and a plurality of insulating block laminae 16B. The segmented mold forms 18 are squeezed by the cinching straps 21 avoiding interference with the intermittently spaced wear buttons 11.

FIG. 12 describes an alternate means for application to compress the insulation laminae materials. In this method the outer pliable refractory layer 13 is encapsulated by the pneumatically or hydraulically actuated pressure tube 25 having a plurality of rigid molding contour segments 27 attached to the inner surface of the pressure tube 25, the contour segments being in proximity to the outer surface of the pliable refractory 13. The pressure tube 25 is in turn substantially surrounded by the restraint band 29 that is cinched tightly, for example, by the locking clasp 28 so that the inner surface of the restraint band 29 is then in proximity to the outer surface of the tube 25. The pressure tube 25 is next inflated by introduction of a fluid such as air through a control valve 26 to cause expansion of the tube cavity 24 and thus urging the inner surface of the tube 25 against the refractory layer 13. The restraint band 29 is a substantially non-yielding material such as steel that causes the tube 25 to expand radially inwardly forcing the molding segments 27 against the pliable refractory layer 13 as the resilient inner layer of ceramic fiber 14 is compressed.

A device and method for meeting the objects of the invention are shown for an "over-and-under" skid pipe 9 shown in FIG. 13. The double pipe 9 is joined in spaced apart relationship by a connecting bar 35. Anchor strips 31 are secured to opposite sides of the connecting bar 35, preferably by welding. Anchor rods 32 are secured near one end of each anchor band 1 so that each anchor rod may be received within and retained by a corresponding cusp 33. Those skilled in the art appreciate that any suitable means of attachment could suffice. A lug 5 is secured near the remaining end of each anchor strap and again one of such ends is ex-tented so that the ends overlap when the lugs 5 are squeezed together, such as for example, by a common cinching tool. Again the overlapped ends are then welded together or directly to the pipe. After the anchor straps are secured around the over-and-under skid pipe 9, suitably shaped insulation laminae can be applied separately or simultaneously around the pipes using an alternative mold form shown in FIG. 16.

After the ceramic fiber 14 and outer refractory 13 are separately or simultaneously applied around the over-and-under skid pipe 9, a plurality of pins 39 are inserted into the insulation laminae adjacent to the lower pipe. A cap mold segment 36, with holes for receiving the wear buttons 11, is placed atop the skid pipe 9. The cap mold segment 36 has holes for receiving the upper pins 39 (which can then be inserted through the holes and into the insulation laminae) and terminates in a cusp 37 at each end.

Figure 16:
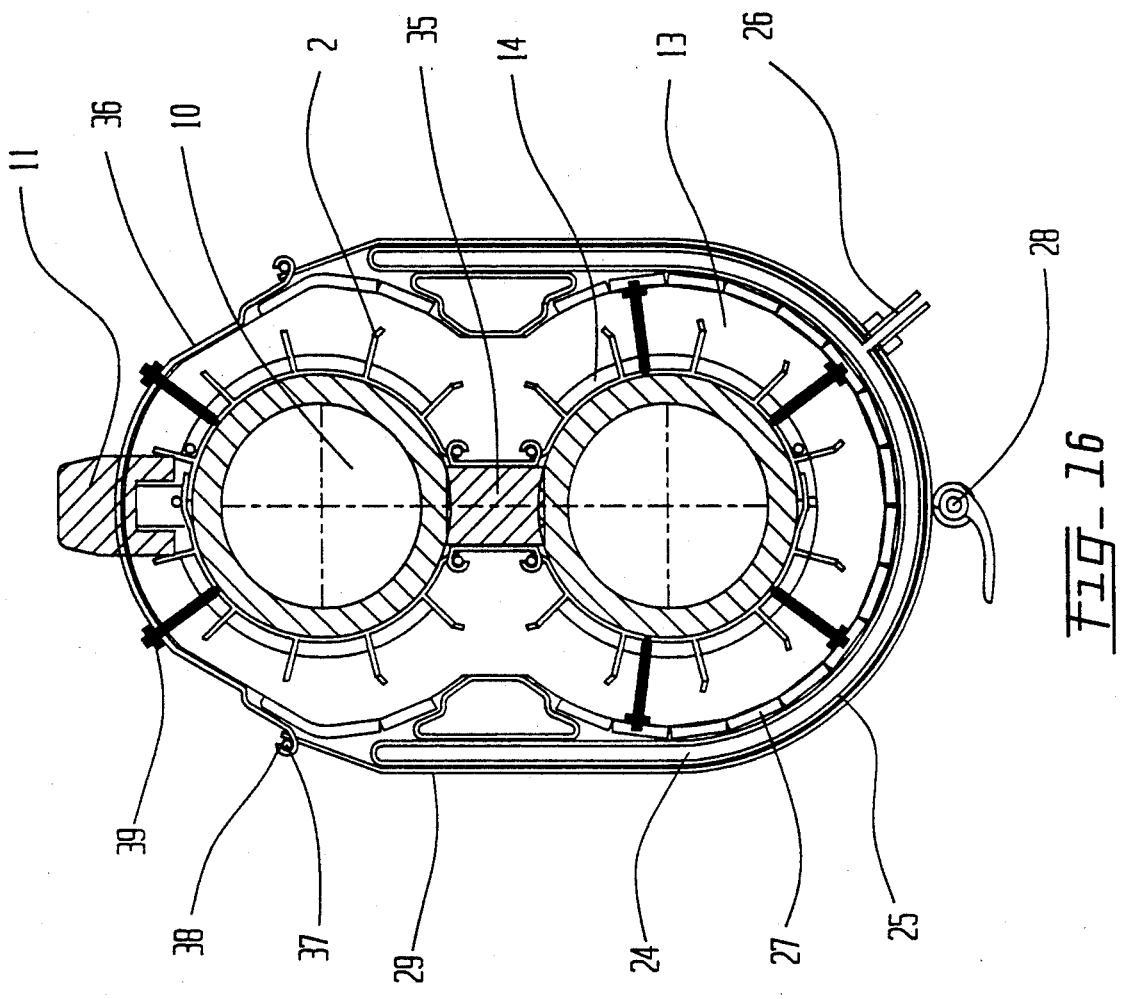
FIG. 16 is a cross-sectional axial view of the "over-and-under" skid pipe of FIG. 13 showing the method of adapting the pneumatic compression device to operate with the double pipe.
Figure 17:
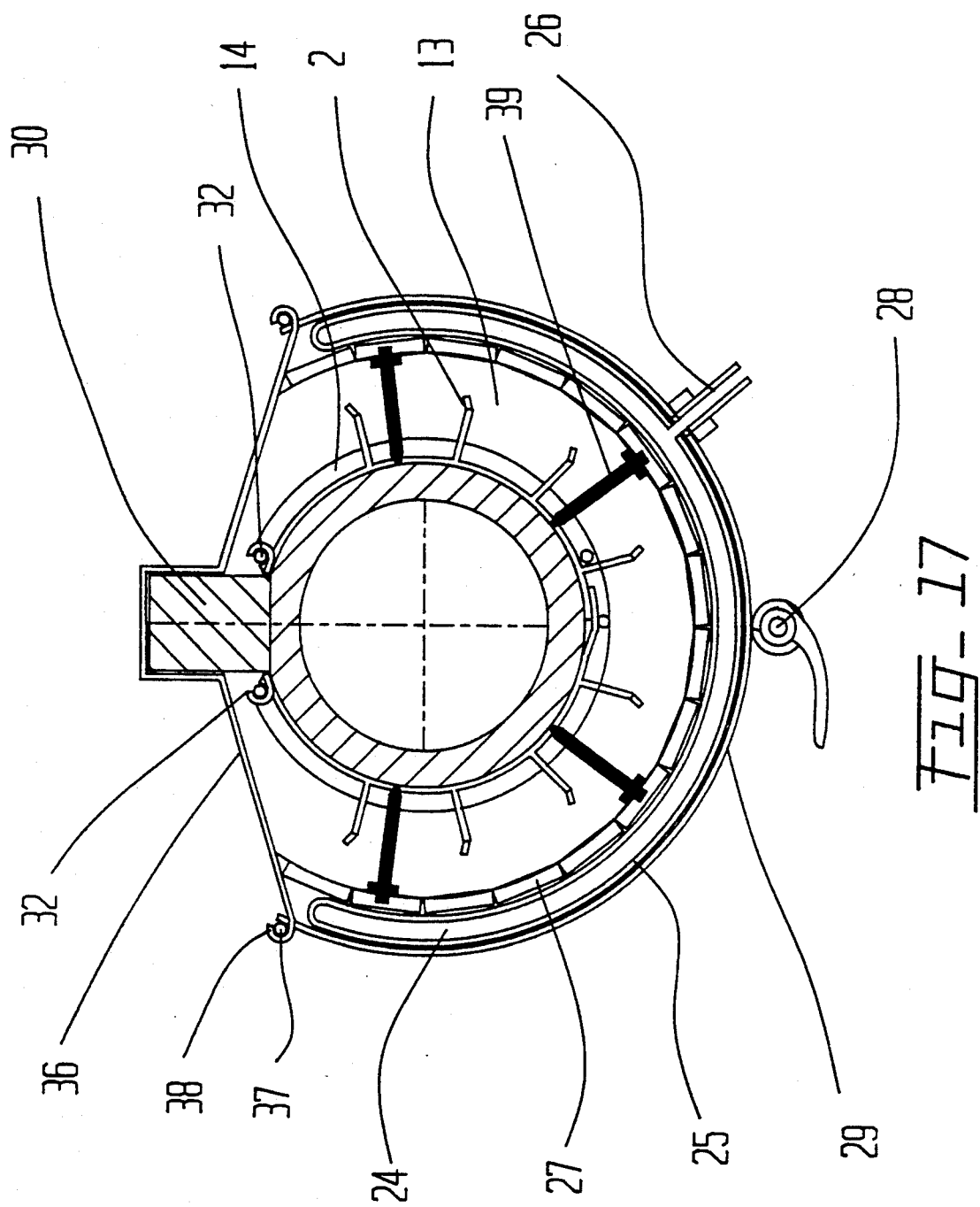

A contour block 40 is preferably located as shown in FIG. 16 to more generally conform the refractory 13 to the exterior of the skid pipe 9.

A pair of restraint band segments 29B, each having an upper and lower end and a rod 38 near each upper end, is secured around the skid pipe 9 and to the cap mold segment 36 by securing the rod 38 into the corresponding cusp 37. The latch 28 secures the two lower ends of the restraint bands together. Again a fluid such as air is injected through the control valve 26 to expand the cavity 24B. This expansion both compresses the rigid mold segments 27 against insulation laminae and pulls the cap mold segment 36 in tension thus tending to compress the laminae adjacent to it.

The upper rigid pins 39 are removed, the cap 36, contour blocks 40, restraint bands 29B and lower pins 39 are removed before furnace heating.

Figure 14:
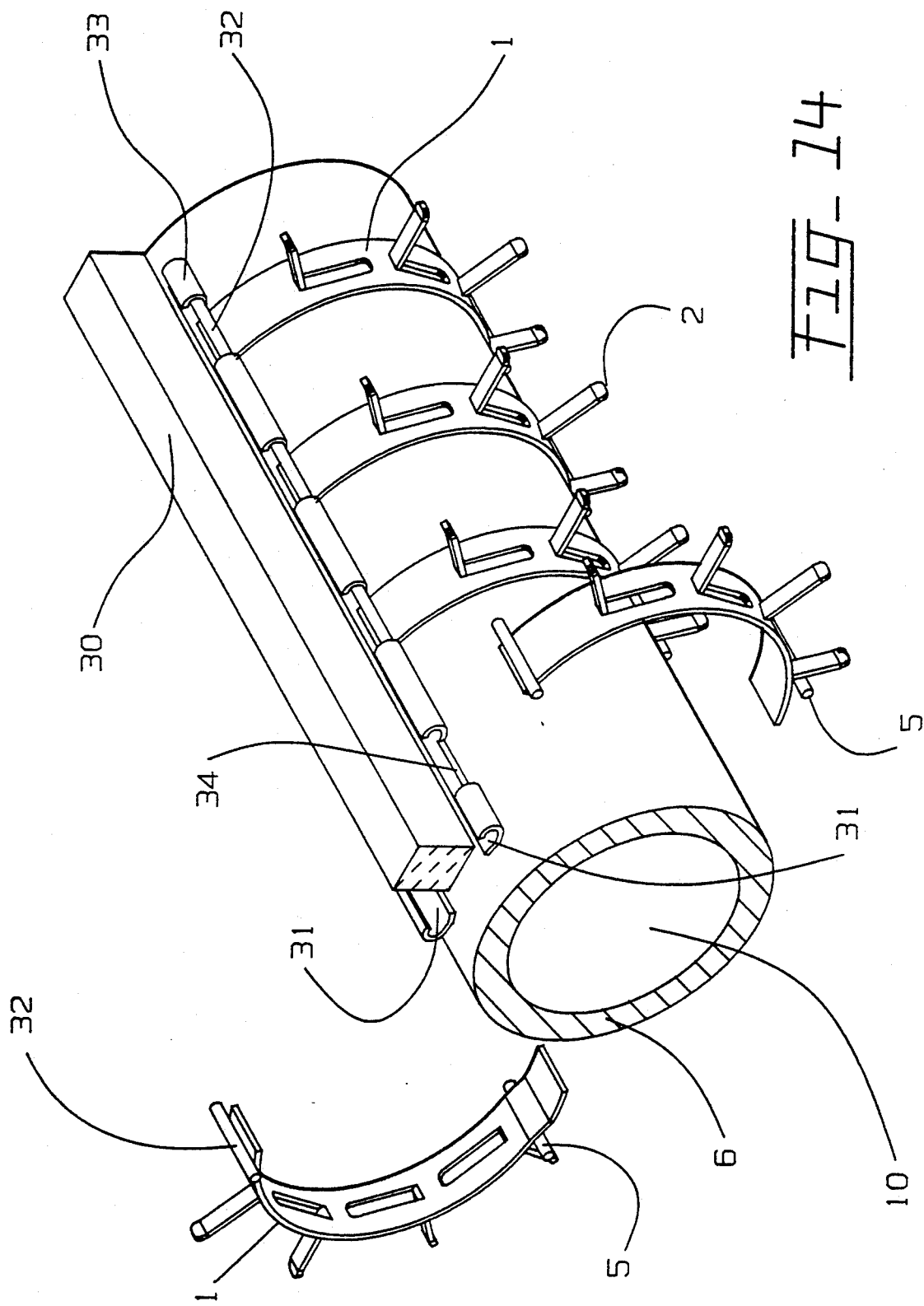
FIG. 14 is an isometric view of a water cooled skid pipe for use in a pusher type furnace showing the method of attaching the anchor straps around the circumference of the pipe not covered by the wear bar.

The novel method may also be used to insulate a skid pipe for a pusher furnace as shown in FIG. 14. The pipe 6 has a wear bar 30. A pair of anchor bars 34 having cusps 33 are secured to the pipe proximate the base of the wear bar 30. Again the first end of each partial anchor band has an anchor rod 32 secured adjacent to it which is received by a pair of the spaced apart cusps 33. The second ends of the pair of partial anchor bands includes one ex-tented end which overlaps and slides relative to the other second end as these second ends are squeezed together, for example, by a common cinching tool biasing a pair of lugs 5 secured proximate to each of the second ends. Again the second ends are preferably welded together or on to the pipe while in tension. Again a suitably shaped insulation laminae or laminae block is impaled on the prongs 2 and then formed around and secured to the exposed part of the pipe 6 not covered by the wear bar 30 by using a suitably shaped, flexible mold form segment such as that shown in FIG. 17 so that the resulting insulation substantially surrounds the pipe and terminates proximate to the sides of the wear bar 30.

Figure 17:
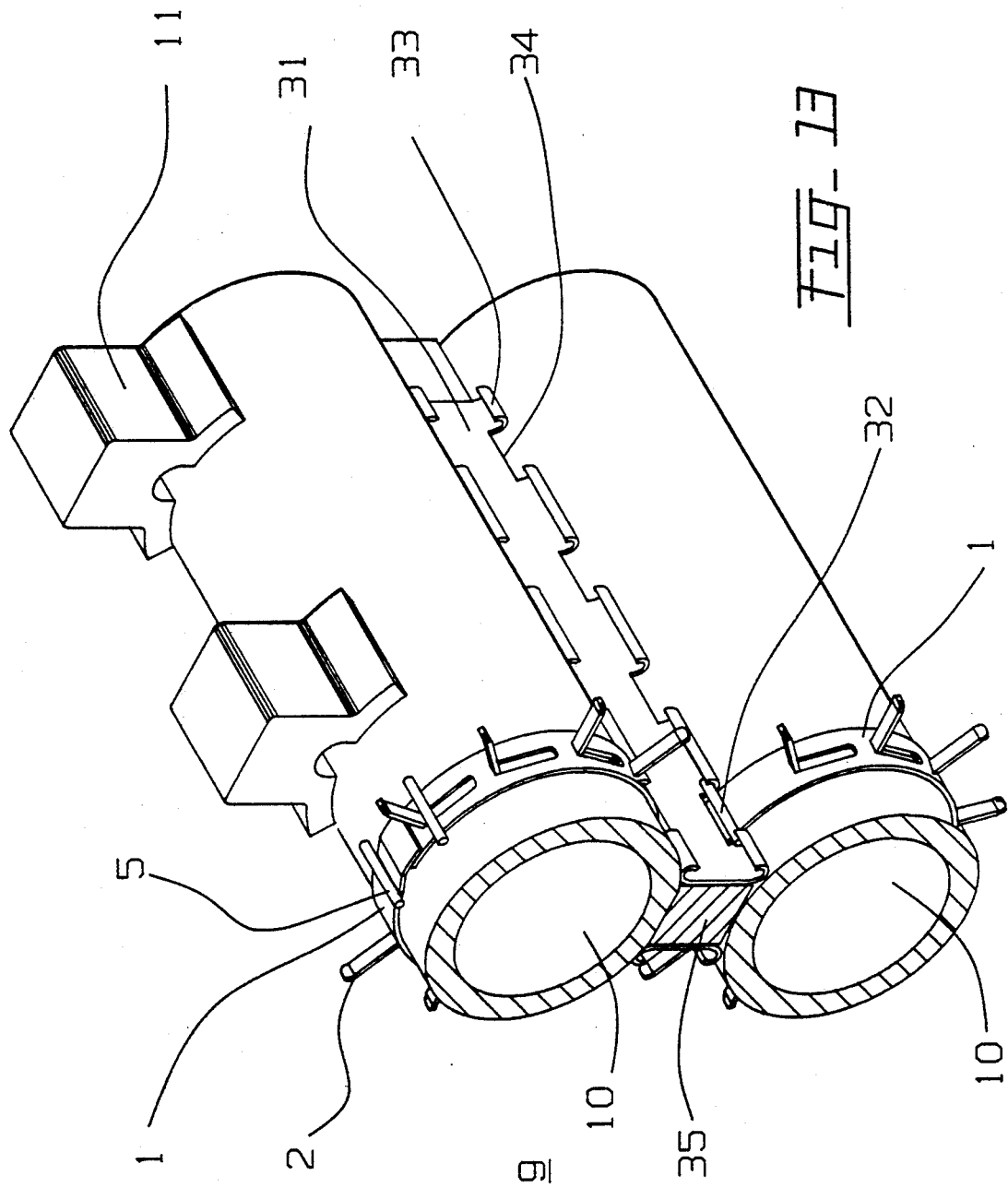
FIG. 17 is an axial view in cross-section illustrating the adaptation and application of the compression device in FIG. 12 to a round skid pipe for a pusher furnace.

The method for insulating a pusher-type skid pipe is shown in FIG. 17. The method includes applying a mold cap segment 36A that conformingly fits over the wear bar 30. The cap terminates in a pair of cusps 37. A pair of restraint band segments each have one end with an anchor rod 38 which is received and restrained by the corresponding cusp 37. The remaining ends are secured together by the latch 28. The operation of the pins 39 and inflation of the cavity 24C against the rigid mold form segments is described above. The pins 39 are removed before firing the furnace.

Figure 15:
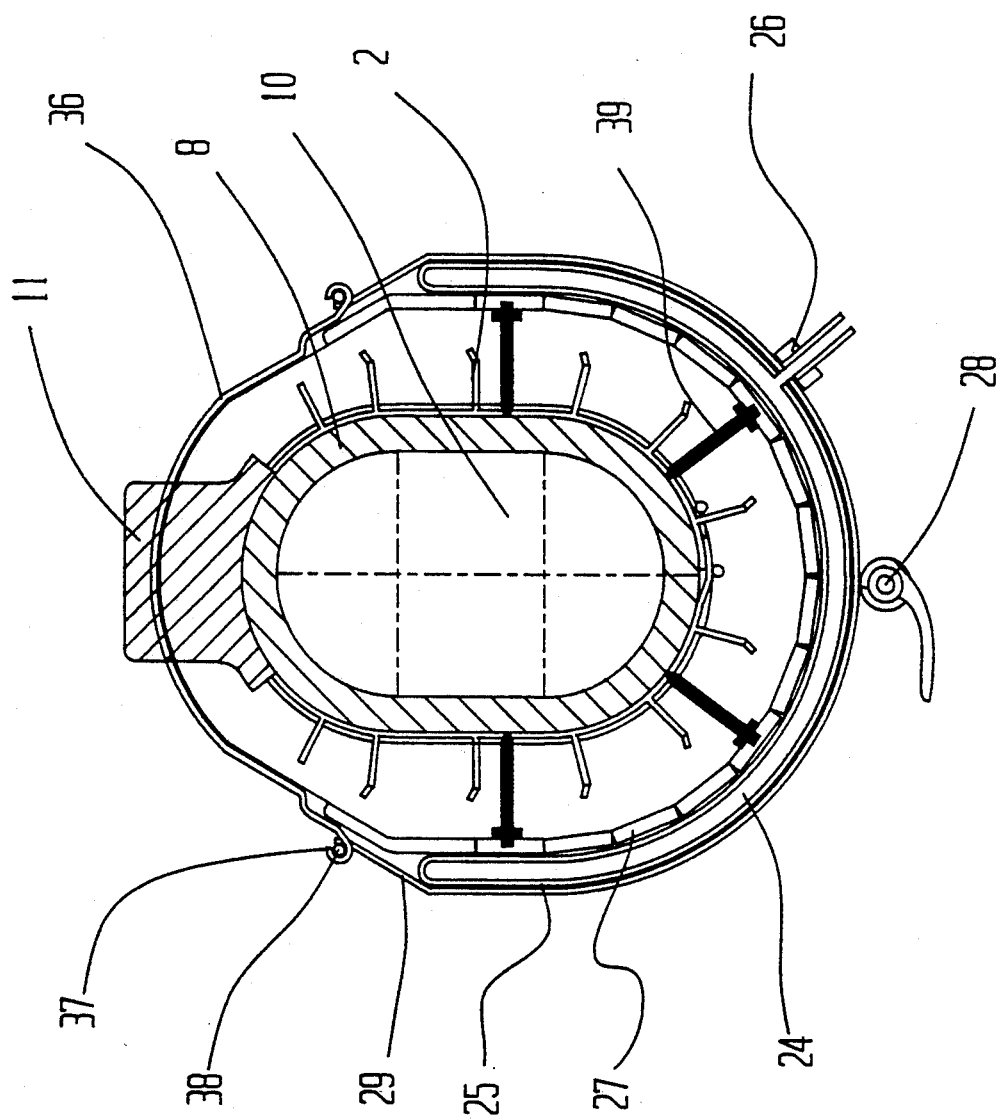
FIG. 15 is a cross-sectional axial view of the skid pipe in FIG. 1 and showing the method of compressing the outer refractory material similar to that for a round pipe in FIG. 12.

Finally, an alternative method and structure for insulating a walking beam skid pipe is shown in FIG. 15. The cap mold segment 36 is the same as that shown and described in FIG. 16 as are the pins 39. The restraint band segments 29A, with rods 38, cavity 24A and rigid mold segments 27 are merely configured for a single pipe 8 of any cross-section.

After all the skid and support pipes have been covered by the structures and methods described herein, the remaining mold forms are removed and reserved for future use. The furnace is prepared for operation and the furnace temperature is increased at a rate prescribed for the pliable refractory material 13 selected.

Those skilled in the art will realize that pliable chemically bonded refractory materials do not require a curing period to develop interstitial bonding as needed with refractory concretes, because the chemical bond of the pliable refractory is formed as the furnace is brought up to operating temperature. It is further understood that newly installed chemically bonded refractory materials may be subjected to a much faster rate of temperature increase during intial heat-up than can refractory concretes.

Those skilled in the art will further understand that any suitable insulating material such as refractory concretes, mortars, ramming mixes or the like can individually, or in combination with ceramic fiber, be attached to the fluidically cooled skid pipe using the described anchoring method.

In all embodiments of the present invention, the flexible anchor band-laminated high temperature ceramic fiber-pliable refractory material insulation is easily and quickly applied to the skid or support pipes.

The present invention as described, illustrated and claimed, therefore, fully supports and meets the objects of the invention. Although a preferred embodiment has been described, those skilled in the art understand that numerous modifications, amendments and alterations of the invention clearly fall within both the spirit and the scope of the specification, drawings and the claims herein.

What is claimed is:

1. A method for insulating an outer circumference of a fluidically cooled pipe for use in a metallurgical reheat furnace comprising the steps of:
   a) applying an anchor band having two ends and a plurality of outwardly projecting prongs therebetween around and in thermal communication with the circumference of the pipe,
   b) securing the two ends of the anchor band together,
   c) applying a ceramic fiber blanket around the exposed outer circumference of the pipe and the anchor band so that the prongs protrude through the fiber blanket,
   d) applying a pliable refractory material around the ceramic fiber blanket so that the prongs of the anchor band project into the refractory material,
   e) positioning a mold form, having a plurality of mold form segments, around the refractory material,
   f) compressing and moving the mold form segments radially inwardly so that the ceramic fiber blanket and the refractory material are compressed radially inwardly, the refractory material is secured to the projecting prongs and the refractory material is maintained in substantial conformity around the pipe, and
   g) delimiting the radially inward movement of the mold form segments a predetermined radial distance from the pipe.

2. The method of claim 1 wherein step a) is performed by tensioning the anchor band around the circumference of the pipe and then securing the two ends of the anchor band together while said anchor band is in tension.

3. The method of claim 1 wherein the delimiting of the movement of the mold form segments includes positioning a plurality of pins, each pin slidably journaled through the mold form segments, said pins carrying a stop means.

4. The method of claim 1 wherein steps a) and b) include providing the anchor band with one ex-tented end slidably received by the other end of the anchor band when circumferentially urged together, securing a pair of lugs onto the anchor band and in proximity to the respective ends of the anchor band and then biasing the lugs circumferentially together so that at least a portion of the ex-tented end is circumferentially and slidably received by the other end of the anchor band wherein the two ends can then be secured together.

5. The method of claim 1 in which the two ends of the anchor band are secured to the pipe.

6. The method of claim 1 in which step c) is the securing of one end of the anchor band to the pipe and to the other end of the anchor band.

7. The method of claim 1 wherein step e) includes preforming an inner ceramic fiber blanket secured to an outer pliable refractory material to form a pliable laminae block and suitably shaping said block to conform with the outer circumference of the pipe to be insulated and then applying the laminae block so that the prongs of the anchor band protrude through the inner ceramic fiber layer and into the outer pliable refractory material.

8. The method of claim 1 wherein steps d) and e) comprise performing a pliable laminae block having an inner ceramic fiber blanket, an outer pliable refractory material and a flexible plastic-like film located between and secured to the ceramic fiber blanket and pliable refractory material, applying the laminae block around the desired portion of the outer circumference of the pipe so that the prongs of the anchor band extend through the ceramic fiber blanket, through the plastic-like film and sufficiently into the pliable refractory material to support the laminae block on the pipe.

9. The method of claim 1 wherein step f) further includes providing a mold form having a plurality of circumferentially adjacent mold form segments which circumferentially slide relative to each other as said mold form segments are compressed radially inwardly.

10. A method of insulating a fluidically cooled pipe having an outer circumference for use in a metallurgical reheat furnace comprising the steps of:
   a) applying an anchor band around the outer circumference of the pipe, said anchor band having an ex-tented end and an in-line end, a plurality of radially outwardly projecting prongs disposed between said ends,
   b) biasing the two ends of the anchor band so that the ends slidably receive one another and tensioning the anchor band around the pipe so that the anchor band is in thermal communication with the pipe,
   c) securing the ends of the anchor band together,
   d) applying a preformed insulator laminae comprising an inner ceramic fiber blanket, an outer pliable refractory material and a plastic-like film disposed between and secured to the ceramic fiber and refractory material around the pipe so that the prongs of the anchor band extend through the ceramic fiber blanket and the plastic-like film a sufficient distance into the refractory material to support the insulator laminae around the pipe,
   e) positioning a mold form, having a plurality of mold forms segments, around the applied insulator laminae, and
   f) compressing the mold form radially inwardly a desired distance so that the insulator laminae is compressed radially inwardly and in substantial conformity with the outer circumference of the pipe.

11. The method of claim 10 wherein the step of biasing the two ends of the anchor band together includes the securing of a lug near each end of the anchor band and urging said lugs toward each other with a cinching tool.

12. The method of claim 10 wherein the compressing of the mold form radially inwardly a desired distance includes providing a plurality of pins having inner and outer ends, the inner end adjacent the pipe, and the outer end slidably received through the mold form, and further providing a means for delimiting the radially inward movement of the mold form as said mold form is biased radially inwardly.

13. The method of claim 10 wherein the step of compressing the mold form radially inwardly includes providing a plurality of adjacent mold form segments each having opposite ends that slidably move relative to the ends of the adjacent mold form segments as said segments are urged radially inwardly.

14. The method of claim 10 wherein step f) includes the positioning of at least one mold compression band around the mold form and having two ends slidably received by one another, securing a lug near each end of said ends, and urging the lugs circumferentially toward each other to compress the contained mold form insulator laminae.

15. The method of claim 10 wherein step e) includes the positioning of a mold form, having an expandable pressure tube radially inward of the mold form, substantially circumferentially around the insulator laminae, a cavity within said pressure tube, a means for injecting a fluid under pressure into the cavity to expand said pressure tube, non-expanding restraint band around the circumference of said pressure tube to direct the expansion of the pressure tube radially inwardly and further positioning a plurality of circumferentially spaced apart mold segments between the pressure tube and the insulator laminae.

16. A method of insulating an over-and-under skid pipe having a pair of spaced apart, axially aligned upper and lower pipes each with an outer circumference, connected by an axially aligned connecting bar having opposing exposed sides, said upper pipe having a plurality of axially aligned, spaced apart wear buttons located approximately atop and projecting upwardly from the upper pipe, comprising the steps of:
 a) securing an anchor strap along each exposed side of the wear bar, said anchor straps each having a plurality, of axially spaced apart and aligned cusps,
 b) positioning a pair of circumferentially opposed anchor band segments around the exposed outer circumferences of the upper and lower pipes and between the wear buttons of the upper pipe, each segment having an anchor rod at one end confirmingly aligned with and received by a pair of the adjacent, axially spaced apart cusps, an opposite end slidably received by the other end of the anchor band segment, and a plurality of prongs projecting radially outwardly therefrom,
 c) biasing the opposite ends of each pair of circumferentially opposed anchor band segments together to place both anchor band segments in intimate contact with the corresponding pipe,
 d) securing the opposite ends together,
 e) applying an inner ceramic fiber blanket and an outer pliable refractory material to form an insulator laminae around the exposed portion of the outer circumferences of the upper and lower pipes so that the prongs project through the ceramic fiber blanket and into the pliable refractory material whereby the surfaces of the upper and lower pipes, excluding the wear buttons, and the connecting bars are substantially covered, and
 f) compressing the ceramic fiber blanket and pliable refractory radially inwardly a predetermined distance so that they are substantially and conformingly secured around the pipes.

17. The method of claim 16 wherein step d) includes the securing of at least one end of the anchor band segment to the outer circumference of the pipe.

18. The method of claim 16 wherein step e) includes the applying of a performed insulator laminae having an inner ceramic fiber blanket, an outer pliable refractory material and a flexible film layer therebetween secured to said ceramic fiber blanket and said pliable refractory material.

19. The method of claim 16 wherein step f) further comprises:
 a) the applying of a cap mold segment which is spaced apart and substantially contoured on the insulated portion of the outer circumference of the upper pipe and having holes therein for slidably receiving the wear buttons, atop the upper pipe, said cap mold segment terminating in opposite ends each having a plurality of axially spaced apart cusps,
 b) positioning a pair of restraint band segments around the remaining portion of the over-and-under skid pipe not covered by the cap mold segment, each of said bands terminating in first ends having a rod secured thereto that is aligned with, received within and supported by the corresponding cusps of the cap mold segment, and second ends that are secured to each other so that the cap mold and the restraint band segments substantially enclose the skid pipe excepting the wear buttons,
 c) disposing an expandable pressure tube substantially between the restraint band segments and the adjacent insulator laminae, said tube having a cavity with an inlet for receiving a fluid under pressure to expand said pressure tube,
 d) contouring the insulator laminae proximate the sides of the wear bars, and
 e) disposing a plurality of circumferentially adjacent mold segments substantially between the insulator laminae and the restraint band and pressuring the pressure tube wherein the pressure tube expands radially inwardly against the insulator laminae to urge the mold cap radially inwardly.

20. The method of claim 16 wherein step f) includes inserting a plurality of substantially flanged head, rigid pins into the insulator laminae, some of said pins located radially inwardly of the mold segments and other pins projecting through the mold cap and thence into the insulator laminae, the flanges of the other pins disposed outward of said mold cap, and each pin being of a selected length.

21. A method for insulating an outer circumference of a skid pipe for a furnace, which pipe has a plurality of axially aligned and spaced apart wear buttons located approximately atop and projecting from the pipe, the method comprising:
 a) applying an anchor bar, having an ex-tented end and an inline end, around the pipe and between adjacent wear buttons, providing a lug near each end of the anchor band, said anchor band having a plurality of radially outwardly projecting prongs, applying a ceramic fiber blanket around the exposed portion of the pipe so that the prongs project through the blanket, applying a pliable refractory material around the ceramic fiber blanket such that the prongs penetrate into the pliable refractory material wherein the refractory material is secured to said prongs, b) applying a cap mold, with holes therethrough for receiving the wear buttons, atop and radially spaced apart from the pipe, the mold cap having a pair of oppositely disposed ends terminating in a pair of cusps, c) securing a pair of restraint band segments, each segment having first and second ends, the first ends of each segment secured to the corresponding cusps of the cap mold and the second ends of each end segment secured to one another so that the mold cap and secured restraint band segments substantially surround the pliable refractory material, d) providing an expandable pressure tube radially inward of the restraint band segments, said pressure tube having a means of communicating a fluid under pressure for expanding the pressure tube, e) disposing a plurality of mold segments substantially between the pressure tube and the adjacent pliable refractory material, f) providing a means for delimiting the radially inwardly movement of the mold segments, and g) expanding the pressure tube to urge the mold segments radially inwardly thereby substantially conforming the pliable refractory material around the ceramic fiber blanket while compressing the ceramic fiber blanket radially inwardly.

22. The method described in claim 21 wherein the skid pipe is a skid pipe for a pusher type furnace having an axially aligned continuous wear bar located approximately atop and projecting from the pipe, and further providing a mold cap with a detente therein for conformingly, slidingly receiving the wear bar therein.

* * * * *